No. 832,906. PATENTED OCT. 9, 1906.
G. E. HARTER.
AGRICULTURAL IMPLEMENT.
APPLICATION FILED MAR. 19, 1906.

WITNESSES:
D. C. Walter
Cornell Schreiber

INVENTOR.
George E. Harter,
By Owen & Owen,
His attorneys.

UNITED STATES PATENT OFFICE.

GEORGE E. HARTER, OF TOLEDO, OHIO, ASSIGNOR TO THE OHIO IMPLEMENT COMPANY, OF TOLEDO, OHIO, A CORPORATION OF OHIO.

AGRICULTURAL IMPLEMENT.

No. 832,906.

Specification of Letters Patent.

Patented Oct. 9, 1906.

Application filed March 19, 1906. Serial No. 306,760.

*To all whom it may concern:*

Be it known that I, GEORGE E. HARTER, a citizen of the United States, and a resident of Toledo, in the county of Lucas and State of Ohio, have invented certain new and useful Improvements in Agricultural Implements; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to agricultural implements, and pertains particularly to hand-operated implements which are used either as a single or double wheeled hoe, rake, plow, mulcher, cultivator, or the like.

The object of my invention is the provision of a cheap, simplified, and improved construction of implement of this class which may be run either astride or between the rows of the crop being cultivated and which has its handle and tool-carrying or drag bars independently adjustable, whereby the handle-bars may be readily adjusted to suit the height of the person operating it and the tool-bars permitted to have a relative vertical adjustment as the irregular forms of like tools carried thereby may require to enable them to rest evenly and take the same bite of soil.

To this end the invention consists of certain novel features of construction, combination, and arrangement of the parts thereof, as is hereinafter fully described and which is illustrated in the accompanying drawings, in which—

Figure 1:
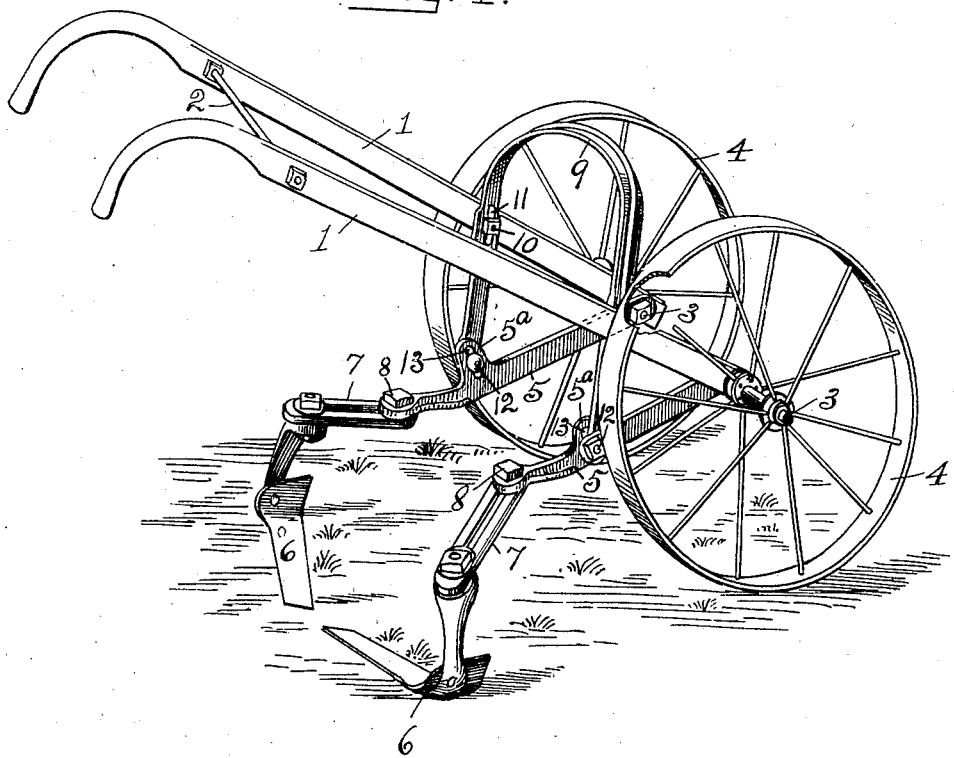
Figure 2:
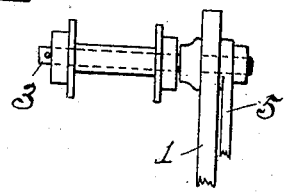

Figure 1 is a perspective view of the implement comprising my invention, the same being shown as equipped with double wheels and with hoes or weed-cutting tools; and Fig. 2 is a detail of the connection between a handle-bar, drag-bar, and wheel-axle.

Referring to the drawings, 1 1 represent companion handle-bars, which are firmly spaced apart near their upper ends by a bracing-rod 2 and have the laterally-disposed outwardly-projecting axles or stub-shafts 3 3 fixed to their forward ends for carrying the supporting-wheels 4 4. Pivotally attached to the inner end of each axle 3 is a rearwardly-extending drag-bar 5, which has its rear end apertured to enable a tool to be attached thereto. In the illustration each bar 5 is shown as having a hoe or weeding-tool 6 attached to its apertured end through the medium of an adjustable extension bar or link 7, which is secured to the bar 5 by a bolt 8.

The handle-bars 1 1 are firmly spaced apart near their forward ends by an arched or inverted-U-shaped member 9, which has each leg or side adjustably secured to the contiguous handle-bar by a bolt 10, passing through a longitudinal slot 11 in said leg or side and an aperture (not shown) in the handle-bar. The legs or terminals of the member 9 extend downwardly from their point of connection with the handle-bars, and each is adjustably attached to an ear $5^a$ on the contiguous drag-bar 5 by a bolt 12, which passes through an aperture in the lower end of the leg and a vertically-disposed slot 13 in the ear $5^a$.

By the construction and manner of connecting the handle and drag-bars of the implement it is apparent that the handle-bars may be quickly and easily adjusted to suit the height of the operator by a relative adjustment of the arch 9 and handle-bars and also that the drag bars 5 may be relatively adjusted to cause the tools attached thereto to rest evenly when attached to an implement. This feature of adjustment of the drag-bars is an important one when the accomplishment of good work is taken into consideration and is also necessary to the easy running of an implement of this class, as it is found where one tool takes a deeper cut of the soil than another that it is necessary for the operator to push harder on one handle than the other to overcome the increased resistance on that side, and thus cause the machine to run straight.

The high arch and unobstructed space between the drag-bars 5 enables the implement when equipped with double wheels to run astride a row of plants as high as the top of the arch without injury to such plants.

It is apparent that in addition to the adjustable features of my invention the implement embodying the same is light, cheap, and durable in its construction and capable of having its parts easily and quickly folded on each other or disassembled for the purpose of storing or packing.

Having thus described my invention, what

I claim as new, and desire to secure by Letters Patent, is—

1. In an agricultural implement, a pair of pivoted handle-bars, a pivoted drag-bar below each handle-bar, an arched member secured to and spacing the handle-bars apart and having downwardly-projecting arms in adjustable connection with the drag-bars, whereby the drag-bars may have vertical adjustment relative to each other and to the handle-bars.

2. In an agricultural implement, a pair of handle-bars, a pair of pivoted drag-bars, and a member having adjustable connection with the handle-bars and also with the drag-bars, whereby the handle-bars may be raised and lowered relative to the drag-bars and the drag-bars adjusted vertically relative to each other and to the handle-bars.

3. In an agricultural implement, a pair of pivoted handle-bars, a pair of pivoted drag-bars, an arched member secured between the handle-bars to the rear of their pivots and having slotted adjustable connection therewith and provided with downwardly-extending arms which have slotted connection with the drag-bars, whereby the handle-bars may have adjustment relative to the drag-bars and the drag-bars have vertical adjustment relative to each other.

4. An agricultural implement comprising a pair of handle-bars, a wheeled support for the forward ends of the handle-bars, drag-bars trailing from said support, and an inverted-U-shaped arch secured between the handle-bars and having its terminals adjustably attached to the drag-bars whereby the drag-bars may have a vertical adjustment relative to each other and to the handle-bars.

5. In an agricultural implement, a pair of handle-bars, a stub-axle carried at the forward end of each bar, a wheel carried by each axle, a drag-bar trailing from the inner end of each axle, and an inverted-U-shaped member spacing the handle-bars apart and adjustably secured thereto and having its terminals extending below the handle-bars and adjustably connected to the drag-bars, substantially as described.

In testimony whereof I have hereunto signed my name in the presence of two subscribing witnesses.

GEORGE E. HARTER.

Witnesses:
C. W. OWEN,
ROWELL SCHREIBLE.